United States Patent [19]

Barnes

[11] Patent Number: 4,501,085
[45] Date of Patent: Feb. 26, 1985

[54] CASTING ROD

[76] Inventor: Lant I. Barnes, 10811 Clearbrook La., Dallas, Tex. 75218

[21] Appl. No.: 336,504

[22] Filed: Dec. 31, 1981

[51] Int. Cl.³ .............................................. A01K 91/02
[52] U.S. Cl. .......................................... 43/19; 124/74
[58] Field of Search ................. 43/19; 124/55, 57, 71, 124/74, 76

[56] References Cited

U.S. PATENT DOCUMENTS

| 27,568 | 1/1973 | Vadas et al. | 124/76 |
| 2,864,197 | 12/1958 | Johnson | 43/19 |
| 2,958,975 | 11/1960 | Neff et al. | 43/19 |
| 2,977,706 | 4/1961 | Merz | 43/19 |
| 4,147,152 | 4/1979 | Fischer et al. | 124/74 |

Primary Examiner—Nicholas P. Godici
Assistant Examiner—M. Jordan
Attorney, Agent, or Firm—Peter J. Murphy

[57] ABSTRACT

A casting rod includes an elongated piston chamber tube and a connected guide tube for enclosing and guiding a push rod to accelerate and project a fishing lure or other weighted device attached to a line. The push rod has a piston fixed to its rearward end for coaction with the chamber tube, and the rod projects through the guide tube having a mounting tube at its exterior exposed end which is the rod tip. A weighted device has an axial pin received within the mounting tube and attached to the line which passes through a line aperture in the mounting tube. The rod includes a valve housing and handle at its base end, the handle enclosing a $CO_2$ cartridge which is pierced to pressurize the valve chamber. A valve interposed between the valve chamber and the cylinder chamber is opened momentarily by a firing pin impacted by a hammer to pass a charge of pressurized gas to the piston chamber to accelerate the push rod and project the lure. The hammer is cocked against a compression spring and locked by a trigger mechanism, and released by the trigger to operate the valve.

1 Claim, 10 Drawing Figures

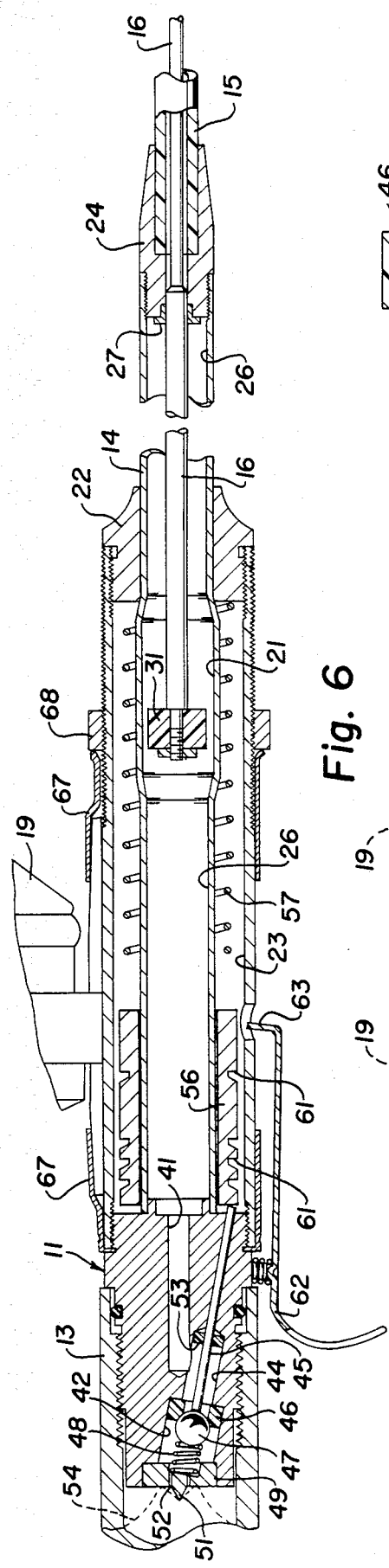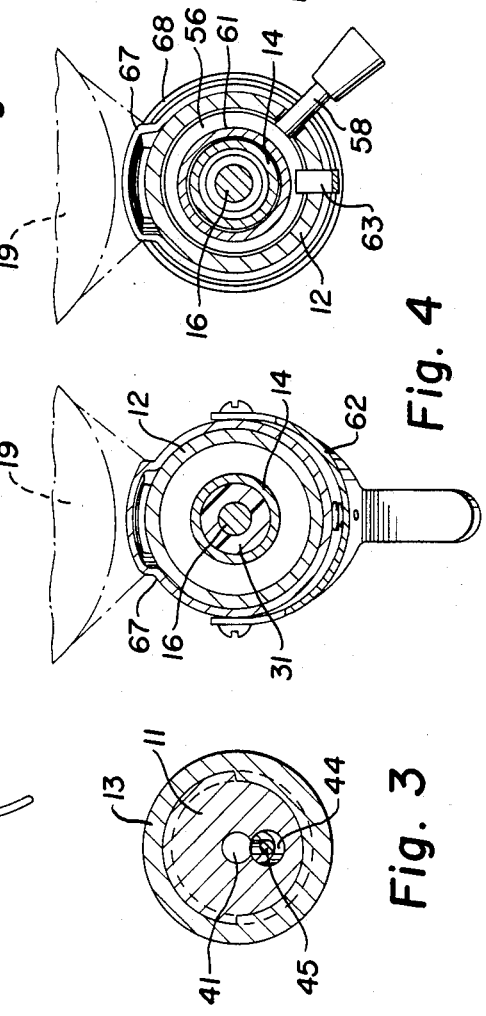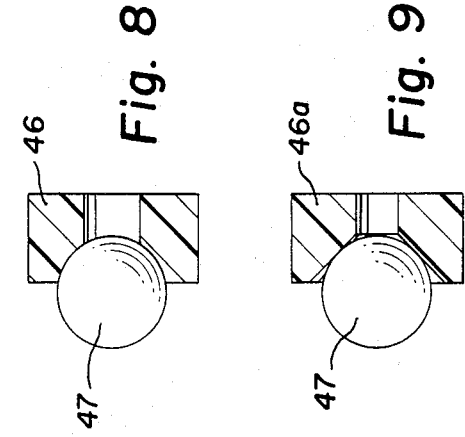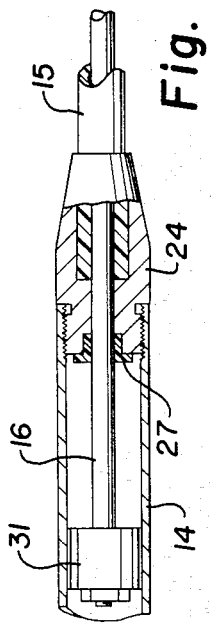

CASTING ROD

This invention relates to a gas powered casting rod for projecting a hook bearing fishing lure or plug and, in a broader sense, to a gas powered device for projecting through the air a weighted plug or other mass with a line attached.

While the casting rod form of the invention, for use by fishermen, is described in this specification, it will be understood that the invention is directed as well to apparatus having similar form and designed for other uses.

Casting rod apparatus of the type described has been known for some time as evidenced by Johnson U.S. Pat. No. 2,864,197, issued Dec. 16, 1958 and Merz U.S. Pat. No. 2,977,706 issued Apr. 4, 1961. Efforts to produce a practical working device in accordance with those earlier patents have not been successful. The principal reason that earlier devices have not been successful is that the valves for releasing charges of pressurized gas to effect the projecting of the fishing lure have not been able to retain the pressure in the closed position, resulting in loss of the gas pressure and failure of the device. In the devices described in the above mentioned patents the pressurized gas is supplied by means of a $CO_2$ cartridge contained in the handle of the casting rod; and it will be apparent that if the valve does not hold the pressure, the supply of pressurized gas will be exhausted in a very short time.

A principal object of this invention is to provide a casting rod for the casting of a conventional fishing lure which rod obviates the need for the conventional physical casting motion and instead projects the lure by means of a gas powered projection mechanism.

A related object is to provide a casting rod which enables persons who are physically handicapped or otherwise unable to use a conventional casting rod, to enjoy the pleasure and sport of cast fishing.

Another object of this invention is to provide a projecting device having the capacity to project a weighted plug with line attached for any desired purpose such as running a line over a high tension wire, running a line over a tree branch, running a line to an elevated building structure.

A further object of this invention is to provide apparatus of the type described which is light in weight, simple in design, convenient to use, and which may be readily stored for use when desired.

Still another object of this invention is to provide a device of the type described which utilizes a $CO_2$ cartridge self-contained in the handle of the device making it completely portable and self-contained.

These objects are accomplished in a projecting device which includes an elongated cylinder tube and an elongated guide tube which projects from the cylinder tube and defines the tip end of the device. An elongated push rod is disposed within these tubes being generally coextensive therewith, and has a piston adjacent to its inner end for coaction with the cylinder tube. A valve housing mounted at the base end of the cylinder tube contains valve means for controlling the flow of pressurized gas to the cylinder tube to extend the push rod within the tubes. The valve means is operated by a firing pin which is impacted by a spring biased reciprocable hammer; and a trigger means on the device locks the hammer in a cocked position and releases the hammer to impact the firing pin. The improvement in that assembly includes a valve means which comprises a ball closure member and an annular seat member providing a band seal with the ball closure member, and a valve spring urges the ball closure member into sealing engagement with the seat member. The annular seat member provides a central passage for gas flow and for passing the firing pin to engage and unseat the ball closure member.

The novel features and the advantages of the invention, as well as additional objects thereof, will be understood more fully from the following description when read in connection with the accompanying drawings.

DRAWINGS

FIG. 1 is a side view of a fishing rod and lure according to the invention, and an associated reel;

FIGS. 2A and 2B taken together are an enlarged view of the assembly of FIG. 1, with the fishing rod being shown in longitudinal section;

FIGS. 3, 4 and 5 are transverse sectional views taken along the lines 3—3, 4—4 and 5—5, respectively, in FIG. 1;

FIG. 6 is an enlarged fragmentary longitudinal sectional view of the rod of FIG. 1 showing the parts in different operative positions;

FIG. 7 is a fragmentary longitudinal sectional view of the rod of FIG. 1, again showing some of the parts in different operative positions; and FIGS. 8 and 9 are detail views showing different forms of ball valve and seat configurations for the valve shown in FIGS. 2 and 6.

DESCRIPTION OF THE PREFERRED EMBODIMENT

Figure 1:
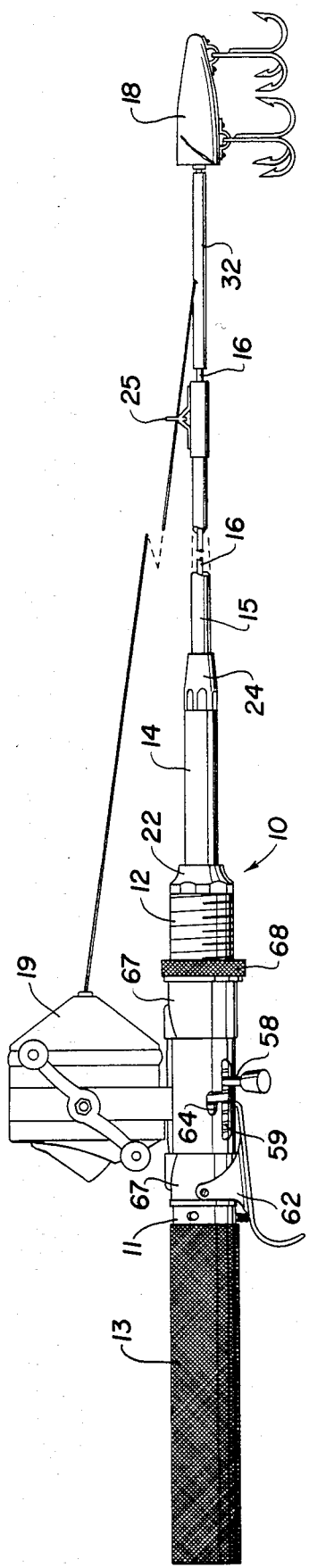

The drawings illustrate a casting rod 10 for use by fishermen, as the preferred form of device according to the invention. Referring to the drawings, the principal components which make up the rod 10 as viewed from the exterior include a valve body or housing 11, a tubular reel seat housing 12 attached to the forward end of the valve housing, a hollow handle 13 attached to the rearward end of the valve housing and defining the butt end of the casting rod, a piston chamber tube 14 which is partially within and projects forwardly from the housing 12, a reduced diameter guide tube 15 which projects forwardly from the piston chamber and the tip end of a push rod 16 which projects from the tip end of the guide tube and provides a mount for a lure 18. The reel seat housing 12 provides a mount, to be described, for a conventional fishing reel 19.

Referring now to these components in greater detail, the housing 12 is threadedly attached to the forward end of the valve housing 11; and the valve housing includes a central boss at its forward face to which the inner end of the piston chamber tube 14 is attached or fitted around. The piston chamber tube is generally uniform in cross-section, but includes an enlargement 21 intermediate its ends which is disposed just within the outer end of the reel seat housing 12. The piston chamber tube is retained within the reel seat housing by means of a retainer nut 22 which is threadedly secured to the housing and bears against the outer end of the enlargement to retain the chamber tube in secure engagement with the valve housing boss. An elongated annular chamber 23 is then formed between the housing 12 and the piston chamber tube 14. The outer end of the tube 14 is closed by an adaptor nut 24 having a central bore including a counterbore at its outer end for receiving and supporting the inner end of the guide tube 15. One or more eyes 25 may be mounted on the guide tube for guiding the line from the reel 19 to the lure 18.

The push rod 16 is an elongated rod which extends from the inner end of the chamber tube 14 to a point just beyond the tip end of the guide tube 15. The rearward portion of the push rod is of slightly larger diameter than the forward portion for a purpose to be described. A piston 31 is fixed to the rearward end of the push rod for sealing relation with the piston chamber tube 14. A mounting tube 32 is fixed to the exposed tip end of the push rod and defines a mount for the lure 18. The lure may have a generally conventional form including the usual hooks, but is provided with a mounting pin 33 which is dimensioned to be received within the mounting tube and retain the lure at the tip end of the casting rod. The mounting pin includes an eye at its distal end for securing the line thereto; and the line from the reel passes through a line aperture 34 in the mounting tube to allow the line to follow the lure when it is projected as will be described.

The bore of the guide tube 15 and of the adaptor nut 24 is sufficiently large relative to the forward portion of the guide tube 15 to provide a vent path for the chamber 26 within the cylinder tube. An annular seal member 27 is provided at the inner end of the adaptor nut 24 for coaction with the larger rearward end of the push rod 16 to close the chamber 26 when that larger end moves outwardly and enters the bore of the adaptor nut 24. The chamber 26 is then sealed for a purpose to be described subsequently.

Referring now to the valve assembly, best seen in FIG. 6, the valve housing 11 is provided with a central axial passage 41 opening to the forward end of the housing at the center of the boss and therefore to the piston chamber 26. A valve chamber 42 opens to the rearward end of the valve housing and includes a central counter bore providing a rearward facing shoulder 43 squared with the rearward end of the valve housing. A passage 44 extends from the valve chamber to the forward end of the valve body outside the piston chamber tube 14 and therefore communicates with the annular chamber 23. This passage 44 includes a forward smaller diameter portion for guiding a reciprocating firing pin 45, in the form of an elongated rod, and a rearward larger diameter portion which communicates with the rearward end of the axial passage 41, and therefore provides a flow path from the valve chamber 42 to the piston chamber 26. The valve chamber is in the form of a counterbore axially aligned with the passage 44, and forms a shoulder for retaining an annular valve seat member 46 for coaction with a valve closure member 47 in the form of a ball bearing or ball. It is important that a very tight seal be provided; and the valve seat member is preferably fabricated from a somewhat resilient plastic material such as Teflon, and also from a material in which the valve seat can be machined to provide a smooth sealing surface for coaction with the ball. The seat surface is illustrated in FIGS. 6 and 8 as being spherical, preferably generated about a radius which is the same as the radius of the ball 47. The ball and seat would then coact to provide a wide band seal which is very effective. Alternatively, the annular sealing surface of the seat member 46a may be conical, as shown in FIG. 9, and configured for a generally tangential sealing engagement with the valve closure ball, which would also provide an effective band sealing surface, particularly with the valve seat member being fabricated from a somewhat resilient material. An advantage of this valve arrangement is that the valve closure member is always self-centering relative to the valve seat member.

A helical compression spring 48 is seated in a spring seat 49 and normally urges the valve closure ball into sealing engagement with the seat. The spring seat 49 is a disk-like member which is received within the valve housing counterbore maintained against the shoulder 43, and is retained therein by one or more set screws. The outer face of the spring seat is provided with a central piercing boss 51, and is provided with one or more passages 52 allowing gas to pass from the exterior of the valve housing into the valve chamber 42. An annular seal member 53 is disposed within the larger portion of the passage 44 for sealing engagement with the exterior of the firing pin to prevent the flow of gas from the valve chamber to the annular chamber 23. The passages 44 and 41 then provide a sealed passageway communicating the valve chamber with the piston chamber 26.

The handle 13 is an elongated handle closed at one end and threaded at its other end for sealing engagement with the rearward end of the valve housing 11. The handle is configured to receive a $CO_2$ cartridge 54, such that when the handle is fully seated on the valve housing, the cartridge neck will be pierced by the piercing boss 51 allowing pressurized $CO_2$ to flow through the spring seat into the valve chamber 42. As stated, it is important that the valve closure member 47 seal very tightly to prevent the escape of gas except when desired; and the pressure of the gas in the chamber will assist in maintaining the valve seated.

Figure 2A:
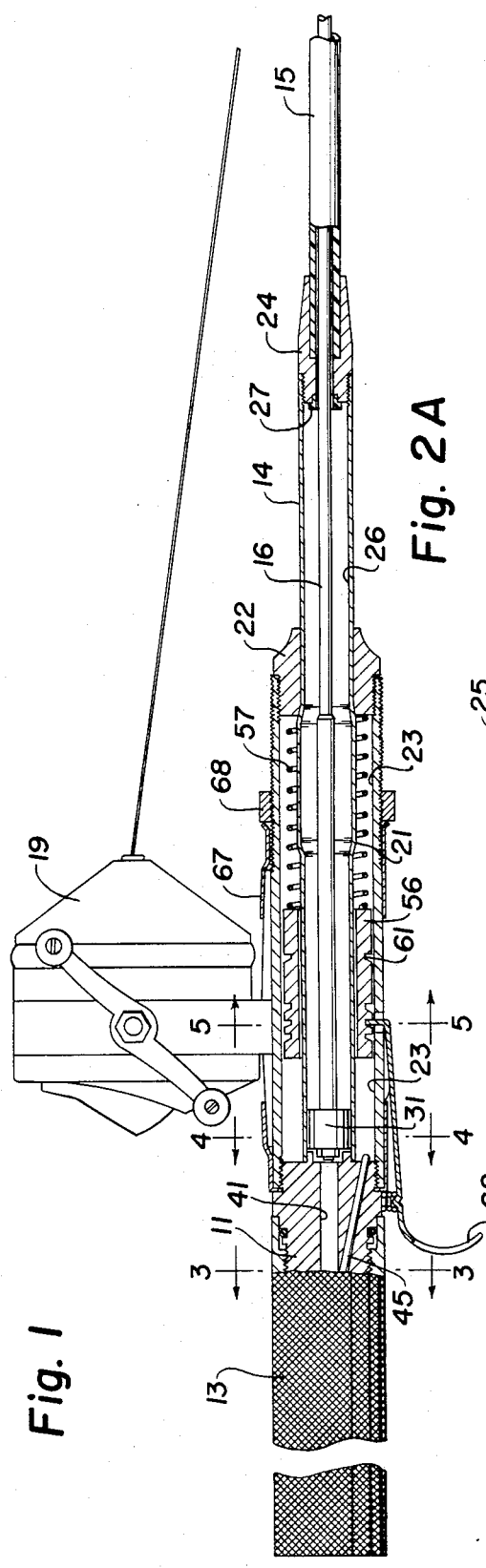

It will be seen that when the firing pin 45 is resting on the valve ball 47, the forward end projects slightly into the annular chamber 23. The firing pin is impacted by an annular hammer 56 which reciprocates within the annular chamber 23; and a compression spring 57 is disposed within the forward portion of this chamber. The valve is operated by cocking the hammer through movement of the hammer forward to compress the spring and latching it in that position, and then releasing the latch to allow the spring to accelerate the hammer rearward to impact with the firing pin 45. The hammer is guided for reciprocating movement by means of a transverse pin 58 which projects through a longitudinally elongated slot 59 in the main tubular housing 12 as best seen in FIG. 1. A knob attached to the pin allows the user to easily shift the hammer forward. It will be seen that the hammer is provided with a plurality of circumferential grooves 61 for coaction with a trigger 62. The trigger is pivotally mounted on the main housing 12 and includes an inward directed dog 63 which passes through a suitable aperture in the housing to engage one of the grooves 61. FIG. 2 illustrates the hammer in the cocked position, and FIG. 6 illustrates the hammer after it has been released by the trigger to impact the firing pin.

The rod includes a safety for preventing inadvertent impacting of the firing pin and this has the form of a lateral J-slot communicating with the elongated slot 59 intermediate its ends. In order for the hammer pin 68 to be moved into the safety J-slot 64, the hammer spring 57 must be compressed and this maintains the hammer in a locked position to minimize the possibility of inadvertent operation.

The reel 19 is secured to the seat housing 12 by a conventional mechanism including rearward and forward reel retaining rings 67 and a jam nut 68 threaded onto the forward end of the seat housing.

OPERATION

Figure 2B:
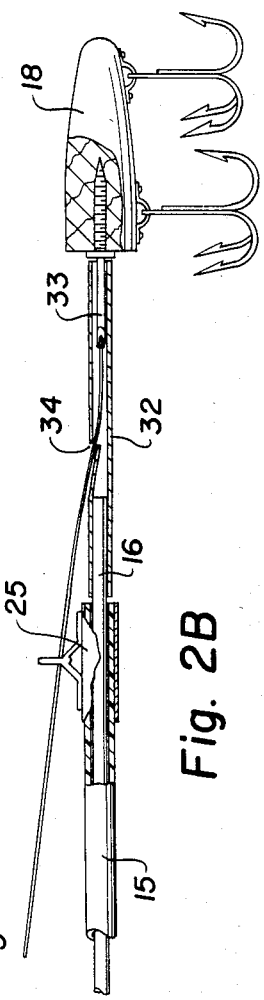

The operation of the casting rod will now be described briefly. With a $CO_2$ cartridge 54 in place, the valve chamber 42 is pressurized. The push rod 16 is moved to its rearward position illustrated in FIGS. 2A and 2B, and line from the reel 19 is threaded through the eye 25 and the line aperture 34 in the mounting tube and then attached to the mounting pin 33 of the lure. The lure is then mounted within the mounting tube as best seen in FIG. 2B.

The hammer 56 is moved forward to the desired position and the trigger dog 63 engaged with a desired groove under the urging of the trigger spring. The rod is then held at the desired elevation, in accordance with the experience of the user, and the trigger pulled to release the hammer. The impact of the hammer with the firing pin unseats the valve closure member 47 momentarily to allow a charge of gas to pass through the passages 44 and 41 into the cylinder chamber 46, imparting rapid acceleration to the piston and push rod to project or throw the lure in the desired trajectory.

When the piston 31 moves into the chamber tube enlargement 21, as seen in FIG. 6, the pressurized gas is allowed to flow around the piston to the forward portion of the piston chamber. At this time the larger diameter portion of the push rod enters the adaptor seal 27 to close the forward end of the piston chamber; and when the piston passes the enlargement 21, the forward portion of the piston chamber is sealed and the gas trapped therein provides a resilient cushion to slow and stop the forward movement of the push rod. FIG. 7 illustrates the push rod at the forward limit of its movement.

The reeling in of the line may return the push rod to its rearward position, or this may be done manually. The reeling in of the line will automatically seat the lure for a succeeding cast. With a very effective tight seating valve, a small seal $CO_2$ cartridge will enable a large number of casts to be performed.

In a possible alternative arrangement for longer use of the fishing rod without changing $CO_2$ cartridges, the handle might be fitted with a hose coupling for connecting the handle to a larger $CO_2$ canister which may, for example, be attached to the belt of a user.

What has been described is an improved gas operated fishing rod which is compact, rugged, and easy to use. A particular advantage of this fishing rod is that it enables many to enjoy this type of fishing who for reasons of lack of skill or possibly physical disability are not able to use a conventional casting rod.

A feature of the invention is that it includes a valve mechanism which is very effective for the intended purpose and which seals very tightly to provide a practical casting rod carrying a self-contained small cartridge of pressurized gas such as $CO_2$.

Another advantage of the invention is that it is extremely easy to use and safe for use by children and adults of all ages.

A further advantage of the invention is that it provides a convenient and effective device for projecting a weighted plug to enable the throwing of a line to places of difficult access. The device therefore has numerous uses in addition to the sport of fishing.

While the preferred embodiment of the invention has been illustrated and described, it will be understood by those skilled in the art that changes and modifications may be resorted to without departing from the spirit and scope of the invention.

What is claimed is:

1. In a projecting device including: a housing providing an elongated cylinder chamber and an elongated guide passage forwardly thereof; an elongated push rod disposed partially within said housing chamber and passage, having a piston mounted adjacent to its rearward end for coaction with said cylinder chamber and having means at its exposed forward end for carrying a plug to be projected; a valve in said housing for controlling the flow of pressurized gas into said cylinder chamber to impel said piston and push rod forward; an actuator pin disposed in said housing for actuating said valve; a spring biased hammer for impacting said actuator pin; and trigger means for locking said hammer in a cocked position and for releasing said hammer to impact said actuator pin; the improvement comprising said valve comprising a ball closure member, and an annular seat member providing a band seal with said ball closure member; and spring means urging said ball closure member into sealing engagement with said seat member;

said annular seat member providing a central passage for gas flow and for receiving said actuator pin to engage and unseat said ball closure member;

said housing including an inner tubular wall defining said cylinder chamber, and an outer wall defining a hammer chamber; said hammer being disposed for reciprocation in said hammer chamber;

a biasing compression spring disposed in said hammer chamber for urging said hammer rearward;

said housing outer wall having a longitudinal slot, and said hammer having a radially projecting pin extending through said longitudinal slot to enable manual shifting of said hammer;

and safety means comprising a slot extending laterally and rearwardly from said longitudinal slot; said safety slot being configured to receive said hammer pin; and said hammer pin being maintained in said safety slot by said hammer biasing spring.

* * * * *